United States Patent Office 3,128,520
Patented Apr. 14, 1964

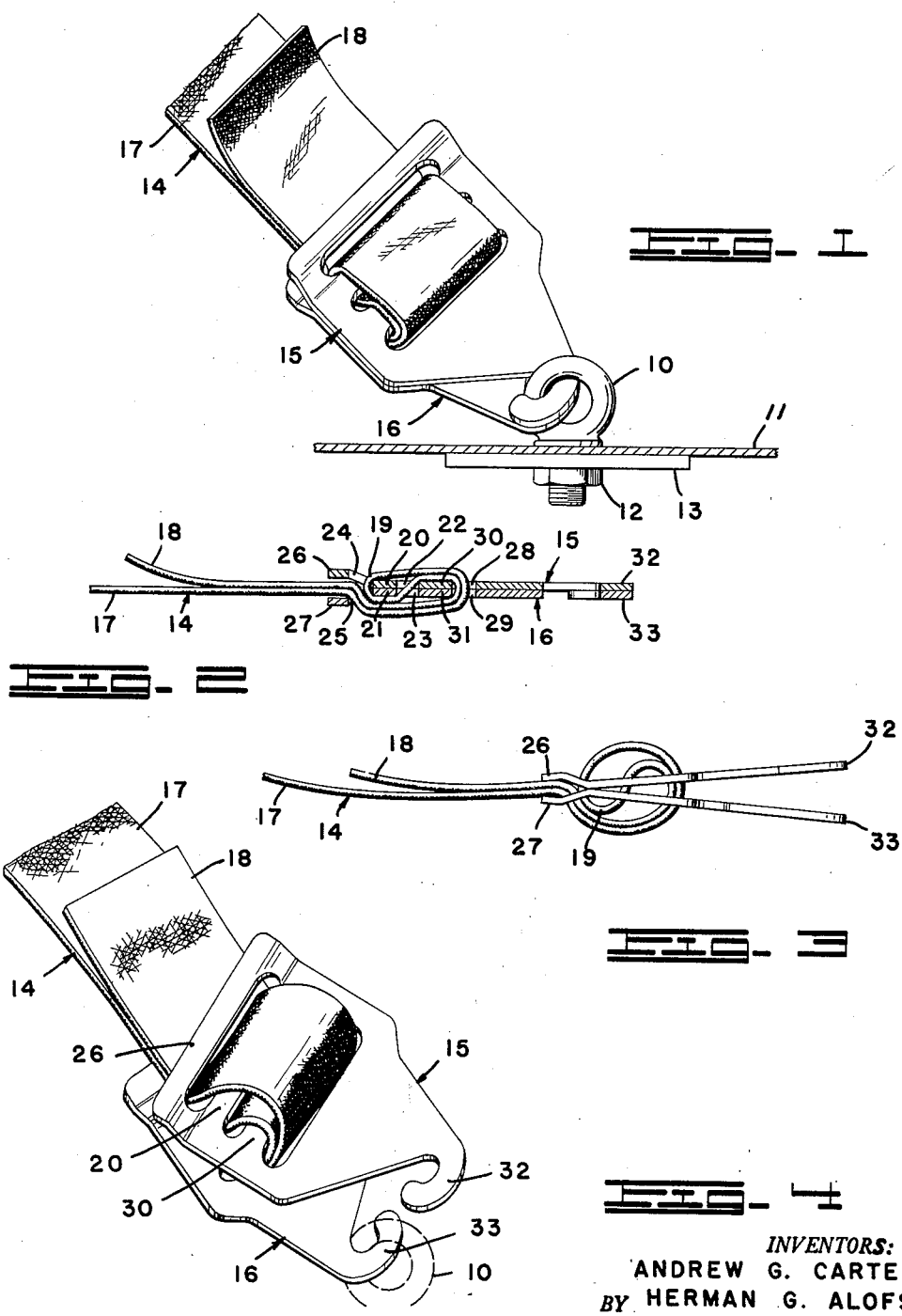

3,128,520
CLAMPED SISTER-HOOK TERMINAL COUPLING FOR SAFETY BELTS
Andrew G. Carter and Herman G. Alofs, Grand Rapids, Mich., assignors to Andrew G. Carter and Harriett T. Carter, a partnership doing business as Carter Engineering Company, Grand Rapids, Mich.
Filed June 19, 1961, Ser. No. 118,121
4 Claims. (Cl. 24—242)

This invention has been developed to provide a disengageable coupling for connecting the ends of safety belts to the terminals which normally remain fixed with respect to the vehicle. While it is desirable that the belt be removable for cleaning replacement, it is vitally necessary that the connection should remain secure against accidental disengagement. A safety belt is subject to a good deal of rough handling and slatting around when it is not in use, and the random positions in which it may be placed must not have the effect of releasing its grip upon the terminal. Were it otherwise, the effect could easily be disastrous upon the user of the belt who happened to be relying upon the security it would normally provide. In a device embodying the present invention, the engagement of the belt with the terminal is maintained even when the belt is in a slack condition. Disengagement of the belt from terminal requires a positive manipulation of the belt with respect to the connecting elements, which practically eliminates the possibility of accidental release. The preferred form of the invention combines the clamping effect of the belt with an arrangement for adjusting the belt length. The same device provides both features, and results in a very inexpensive and effective construction.

The several features of the present invention will be analyzed in detail through a discussion of the particular embodiments illustrated in the accompanying drawing. In the drawing:

FIGURE 1 presents a perspective view, partially in section, showing a safety belt connected to a sister-hook assembly in engagement with a floor-mounted eyebolt.

FIGURE 2 is a sectional elevation through the central portion of the sister-hook assembly, shown in the closed position.

FIGURE 3 presents a view in side elevation of the sister-hook elements opened for engagement or disengagement from the eyebolt, and illustrates the corresponding belt position.

FIGURE 4 illustrates the manner in which the opened assembly is engaged with the eyebolt.

Referring to the drawing, the eyebolt 10 is shown secured to the floor panel 11 with the nut 12. The enlarged disc or washer 13 is provided to distribute the stresses across a substantial area of the panel 11 to avoid local pull-out on application of severe loading.

The belt 14 engages the two similarly-formed sister-hook elements 15 and 16 in a manner best illustrated in FIGURE 2. The belt 14 may be considered as including a tension section 17 and a free end 18. These two portions result from the formation of a loop indicated at 19 embracing the central bars 20 and 21 of the sister-hook elements 15 and 16, respectively. The bars 20 and 21 are defined by the slots 22—23 and 24—25, with the latter slots also defining the end bars 26 and 27 in the elements 15 and 16. The slots 28 and 29 cooperate with the slots 22 and 23 to define the bars 30 and 31, to complete the groups of three parallel bars in each of the hook elements 15 and 16 according to the preferred form of the invention.

Each of the hook elements has a hook portion as identified at 32 and 33, and these together completely define an opening receiving the eyebolt 10 when the elements are in the closed position shown in FIGURE 2. The elements 15 and 16 are identical, and the upper element 15 can perform the function of the lower element 16 by simple inversion. This inversion causes the bars 26 and 27 to provide a space between them as a result of being offset from the plane of separation of the two elements. The belt loop formed at 19 is preferably arranged so that both ends of the loop are brought around the bars 30 and 31, and re-enter the slot 25 to emerge from the space between the bars 26 and 27. It will be obvious that application of tension on the section 17 of the belt will result in a tendency to clamp the hook elements 15 and 16 securely together in the FIGURE 2 position. The interengagement of the belt with the several bars will produce a natural tendency for belt friction to maintain this closed position until a positive manual manipulation is applied which causes the ends 17 and 18 to move inwardly between the spaced bars 26 and 27 so that slack is applied in the belt as shown in FIGURE 3. Only under these circumstances can the hook portions 32 and 33 be separated sufficiently to admit the eyebolt 10 or become disengaged from it. The slack position, established as shown in FIGURE 3, can also be utilized to adjust the length of the belt. When the length has been established as desired, and the hook portions 32 and 33 successively engaged as shown in FIGURE 4, application of belt tension will result in tightly closing the hook elements 15 and 16 into superimposed relationship as shown in FIGURE 1. In this position, the hook elements 32 and 33 form an opening for receiving the eyebolt 10, and will normally remain in engagement therewith under all conditions which do not involve intentional manipulation for release.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. A coupling, comprising: a pair of normally superimposed and similarly-formed sister-hook elements each including a portion provided with three parallel aligned slots forming spaced outer, central and inner bars, said outer bar forming an edge of the respective element and being offset from the plane of separation of said elements, each of said elements also having a hook portion at the opposite end thereof from said offset bar, said hook portions normally extending in opposite directions, having surfaces coplanar with said plane of separation and defining an opening when said elements are held together; and belt means looped around the central one of said bars on each of said elements to embrace the same together, both ends thereof extending together around the inner bar on each of said elements and entering the slot in one of said elements defining the offset bar thereof, and emerging between the offset bars of said elements.

2. A coupling, comprising: a pair of normally superimposed and similarly-formed sister-hook elements each including a portion provided with at least three parallel aligned slots forming outer, intermediate and inner spaced bars, one of said bars forming an edge of the respective element and being offset from the plane of separation of said elements, each of said elements also having a hook portion at the opposite end thereof from said offset bar, said hook portions normally extending in opposite directions, having surfaces coplanar with said plane of separation and defining an opening when said elements are held together; and belt means embracing at least two of said bars of each hook element including said intermediate and inner bars whereby belt tension establishes a tendency to hold said elements tightly together.

3. A coupling, comprising: a pair of normally superimposed sister-hook elements each including a portion provided with at least three spaced bars including an outer bar, a central bar and an inner bar, the outer of said bars forming an edge of the respective element and being offset from the plane of separation of said elements, each of said elements also having a hook portion at the opposite end thereof from said offset bar, said hook portions normally extending in opposite directions and defining an opening when said elements are held together; and belt means looped around the central one of said bars on each of said elements to embrace the same together, said belt extending around the inner bar on each of said elements and entering the slot in one of said elements defining the offset bar thereof, and emerging between the offset bars of said elements.

4. A coupling, comprising: a pair of normally superimposed sister-hook elements each including a portion provided with spaced bars including an outer bar, an intermediate bar and an inner bar, each of said elements also having a hook portion at the opposite end thereof from said bars, said hook portions normally extending in opposite directions and defining an opening when said elements are held together; and belt means looped around the intermediate of said bars on each of said elements to embrace the same together, said belt extending also around the inner bar on each of said elements and between said outer bars.

References Cited in the file of this patent

UNITED STATES PATENTS

| | | |
|---|---|---|
| 395,663 | McCord | Jan. 1, 1889 |
| 706,678 | Moorman | Aug. 12, 1902 |
| 733,064 | Marsh | July 7, 1903 |
| 1,595,892 | Teeples | Aug. 10, 1926 |
| 2,636,183 | Andrews | Apr. 28, 1953 |